(12) United States Patent
Yuan et al.

(10) Patent No.: US 9,910,633 B2
(45) Date of Patent: Mar. 6, 2018

(54) SCALABLE STORAGE-LOSS OPTIMIZED FRAMEWORK BASED METHOD AND SYSTEM FOR COLOR GAMUT MAPPING

(71) Applicant: TCL RESEARCH AMERICA INC., San Jose, CA (US)

(72) Inventors: Jianbo Yuan, San Jose, CA (US); Haohong Wang, San Jose, CA (US); Xiaobo Ren, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 14 days.

(21) Appl. No.: 15/152,239

(22) Filed: May 11, 2016

(65) Prior Publication Data
US 2017/0329566 A1    Nov. 16, 2017

(51) Int. Cl.

| | |
|---|---|
| *H04N 1/60* | (2006.01) |
| *H04N 1/56* | (2006.01) |
| *H04N 9/69* | (2006.01) |
| *H04N 9/73* | (2006.01) |
| *G09G 5/02* | (2006.01) |
| *G06T 11/00* | (2006.01) |
| *G06T 7/40* | (2017.01) |
| *G06F 3/147* | (2006.01) |
| *H04N 5/225* | (2006.01) |

(52) U.S. Cl.
CPC ............. *G06F 3/147* (2013.01); *H04N 5/225* (2013.01)

(58) Field of Classification Search
CPC combination set(s) only.
See application file for complete search history.

(56) References Cited

U.S. PATENT DOCUMENTS

| 6,995,870 B2 * | 2/2006 | Holub .................... G06F 3/1267 348/E17.004 |
| 2005/0254073 A1 * | 11/2005 | Braun ....................... H04N 1/60 358/1.9 |
| 2007/0046958 A1 * | 3/2007 | Hoof ......................... G06K 9/00 358/1.9 |
| 2007/0177173 A1 * | 8/2007 | Nishikawa ............. G06K 15/02 358/1.9 |
| 2008/0112026 A1 * | 5/2008 | Kishimoto ............ G06T 11/001 358/518 |
| 2008/0297818 A1 * | 12/2008 | Shimbaru ............ H04N 1/6058 358/1.9 |

(Continued)

*Primary Examiner* — Wesner Sajous
(74) *Attorney, Agent, or Firm* — Anova Law Group, PLLC

(57) ABSTRACT

A method for a scalable storage-loss optimized (SSLO) system for color gamut mapping is provided. The SSLO system method comprises generating a pre-computed color gamut mapping between an input color gamut and an output color gamut; receiving an input signal including a plurality of input pixels from the input signal domain, wherein the input pixels correspond to a set of first color values represented in a first color space; converting the set of the first color values to be a set of second color values represented in a second color space; generating a set of third color values through a mapping modeling and a color reproduction; converting the set of the third color values to be a set of fourth color values represented in the first color space; and outputting an output signal including a plurality of output pixels corresponding to the fourth color values to the output signal domain.

16 Claims, 9 Drawing Sheets

(56) References Cited

U.S. PATENT DOCUMENTS

| | | | | |
|---|---|---|---|---|
| 2009/0231646 A1* | 9/2009 | Yamauchi | ............ | H04N 1/6058 358/523 |
| 2009/0284774 A1* | 11/2009 | Kishimoto | ........... | H04N 1/6027 358/1.9 |
| 2009/0285475 A1* | 11/2009 | Suzuki | ................ | H04N 1/6058 382/162 |
| 2010/0097622 A1* | 4/2010 | Qiao | .................... | H04N 1/6058 358/1.9 |
| 2010/0156929 A1* | 6/2010 | Kuo | .................... | H04N 1/6058 345/604 |
| 2012/0321177 A1* | 12/2012 | Suzuki | ................ | H04N 1/6061 382/162 |

* cited by examiner

SCALABLE STORAGE-LOSS OPTIMIZED FRAMEWORK BASED METHOD AND SYSTEM FOR COLOR GAMUT MAPPING

FIELD OF THE INVENTION

The present invention relates generally to the field of computer technologies and, more particularly, to scalable storage-loss optimized framework for color gamut mapping.

BACKGROUND

With the rapid development of display techniques, displays with revolutionary high resolution and next generation image quality are emerging. Nowadays, the size of TVs and monitors becomes larger and larger, and the resolution becomes higher and higher, for example, 4K and even 5K displays. However, the standard input video signals are falling behind the development of display devices in certain perspectives, for example, color gamut or gamut. A color gamut mismatch between input video signals and output display devices often occurs, i.e., colors of the input video signals are not correctly reproduced in the output display devices.

The color gamut mismatch may also raise issues in cross-media color reproductions, because one color signal or display device is only capable of producing a certain complete subset of colors. It is highly desired to display colors outside the color gamut provided by the display devices with the least distortion, and take advantage of the enhanced and widened color gamut provided by display devices.

Color gamut mapping is an integral part of the color reproduction process. By adjusting the colors with appropriate color gamut mapping algorithms, the color gamut mapping enables original colors to 'fit' inside differently shaped color gamut and authentically transfers images across a range of media. However, the color gamut mapping may not be performed in real-time due to hardware configuration of the output device (e.g., display devices), which has become the bottleneck of the color gamut mapping.

The disclosed methods and systems are directed to solve one or more problems set forth above and other problems.

BRIEF SUMMARY OF THE DISCLOSURE

One aspect of the present disclosure includes a method for a scalable storage-loss optimized (SSLO) system for color gamut mapping is provided. The SSLO system method comprises generating a pre-computed color gamut mapping between an input color gamut and an output color gamut, wherein an input device in an input signal domain has the input color gamut belongs to, and an output device in an output signal domain has the output color gamut; receiving an input signal including a plurality of input pixels from the input device in the input signal domain, wherein the input pixels correspond to a set of first color values represented in a first color space; converting the first of the first color values to be a set of second color values represented in a second color space; based on the pre-computed color gamut mapping and the set of second color values, generating a set of third color values represented in the second color space through a mapping modeling and a color reproduction; converting the set of the third color values to be a set of fourth color values represented in the first color space; and outputting an output signal including a plurality of output pixels corresponding to the fourth color values to the output device in the output signal domain.

Another aspect of the present disclosure includes non-transitory computer-readable medium having computer program for, when being executed by a processor, performing a content retrieval method. The method comprises generating a pre-computed color gamut mapping between an input color gamut and an output color gamut, wherein an input device in an input signal domain has the input color gamut belongs to, and an output device in an output signal domain has the output color gamut; receiving an input signal including a plurality of input pixels from the input device in the input signal domain, wherein the input pixels correspond to a set of first color values represented in a first color space; converting the first of the first color values to be a set of second color values represented in a second color space; based on the pre-computed color gamut mapping and the set of second color values, generating a set of third color values represented in the second color space through a mapping modeling and a color reproduction; converting the set of the third color values to be a set of fourth color values represented in the first color space; and outputting an output signal including a plurality of output pixels corresponding to the fourth color values to the output device in the output signal domain.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which is illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
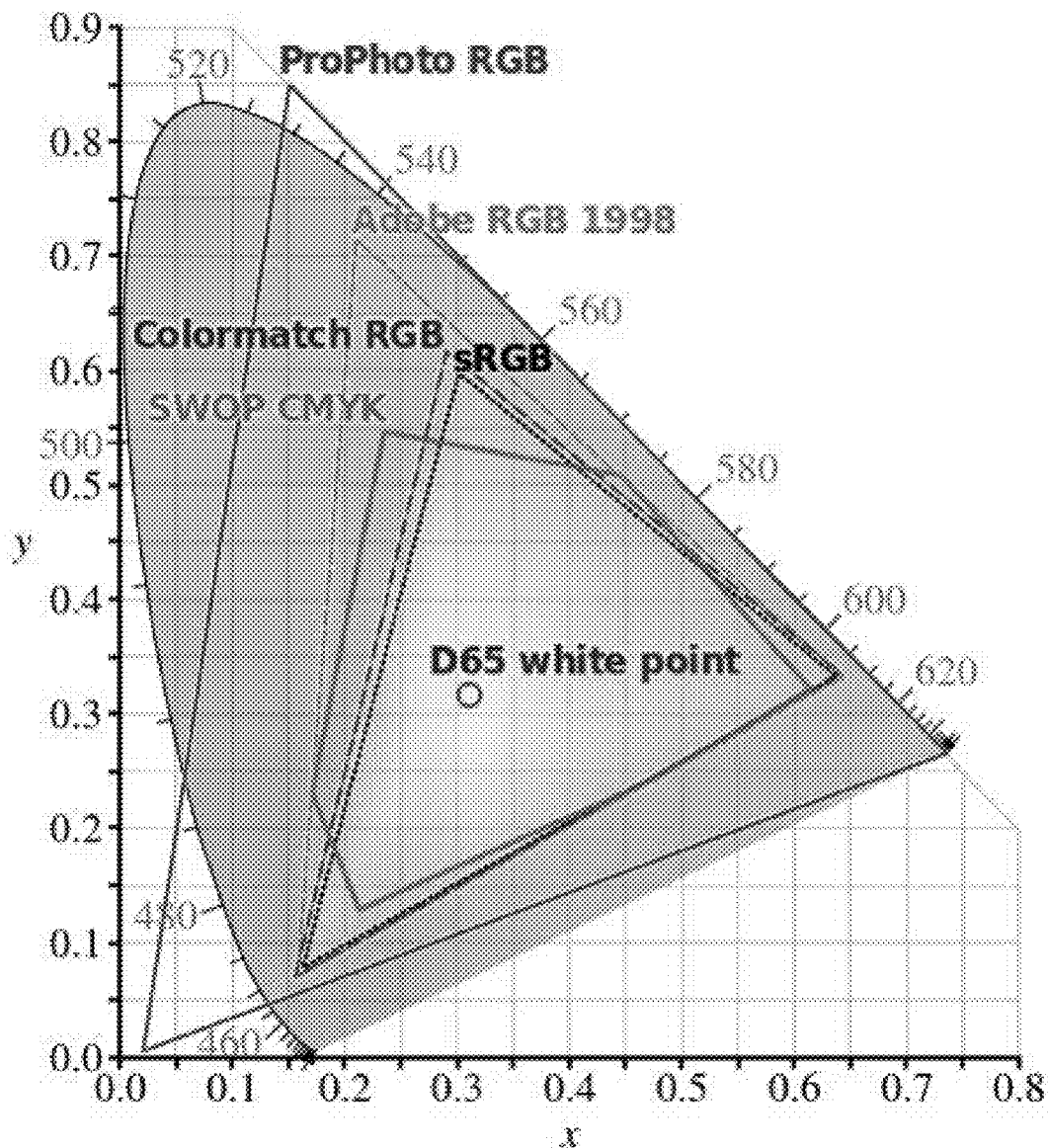
FIG. 1 illustrates an xy chromaticity diagram showing color gamut of representative color systems.

Color gamut or gamut, indicating an entire range of colors which can be accurately represented in a given circumstance, such as by a particular device or provided by a video signal, is one of the perspectives. FIG. 1 illustrates an xy chromaticity diagram showing color gamut of representative color systems.

For example, as shown in FIG. 1, Photographic film can reproduce a larger color gamut than typical television, computer, or home video systems. CRT and similar video displays have a roughly triangular color gamut which covers a significant portion of the visible color space. LCD Screens with certain LED or wide-gamut CCFL backlights yield a more comprehensive gamut than CRTs. Printing typically uses the CMYK color space (cyan, magenta, yellow, and black). Very few printing processes do not include black; however, those processes (with the exception of dye-sublimation printers) are poor at representing low saturation, low intensity colors.

According to FIG. 1, the color gamut mismatch may happen in cross-media color reproductions, because one color signal or display device is only capable of producing a certain complete subset of colors. For example, a user may use a camera to take a photograph and display the photograph on a display device, for example, a TV. The camera is the input device having an input color gamut and the display device is the output device having an output color gamut. The user may have an issue of displaying the correct colors of the photograph on his/her monitor, due to the color gamut mismatch between the camera and the display device.

The user may have the same issue when printing the photograph through a printer, due to the color gamut mismatch between the printer and the camera. The camera is the input device and the printer is the output device. Thus, it is always highly desired to correctly reproduce the colors between the input device and the output device, i.e., between the input color gamut and the output color gamut.

Color gamut mapping between the input color gamut and the output color gamut is an integral part of the color reproduction process. By adjusting the colors with appropriate color gamut mapping algorithms, the color gamut mapping enables original colors to 'fit' inside differently shaped color gamut and authentically transfers images across a range of media. Computing color gamut matching between the input video signals and the output display devices is often solved by general laptops and computers. However, it may be not feasible to solve such a complicated problem on the output device (e.g. display device) in real-time due to the hardware limitation of the display device, such as storage (memory) limitation.

For example, when RGB discretization is used to represent colors, each color channel (R/GB) has 256 scales (0-255 in value), which sums up to 256×256×256 different colors in total. Thus, it may be difficult to load the entire color gamut mapping lossless on the output device (e.g., display device), and the output device may be unable to search the color gamut mapping to find and display the correct output color for each input color in real-time.

To achieve real-time computing, the existing technologies have to involve an approximation step, and pre-computed color gamut matching relationships (i.e., pre-computed color gamut mapping) between the input device and the output device are used as prior knowledge, in order to find a desired approximation of the entire color gamut mapping under a given hardware limitation.

However, the approximation of the entire color gamut mapping may cause certain color loss between the input color gamut and the output color gamut. The approximation of the entire color gamut mapping may either be a mechanism which is able to reproduce output colors based on an extracted model from the entire mapping and, or a process to calculate the output colors by storing a subset of the pre-computed gamut mapping.

For example, the use may use pre-computed color gamut mapping as prior knowledge and implement tetrahedral interpolation for digital TV color reproduction enhancement. The same prior knowledge may also be used for training a neural network for regression and followed up by a look-up table to generate the output colors given each input RGB value.

Figure 2:
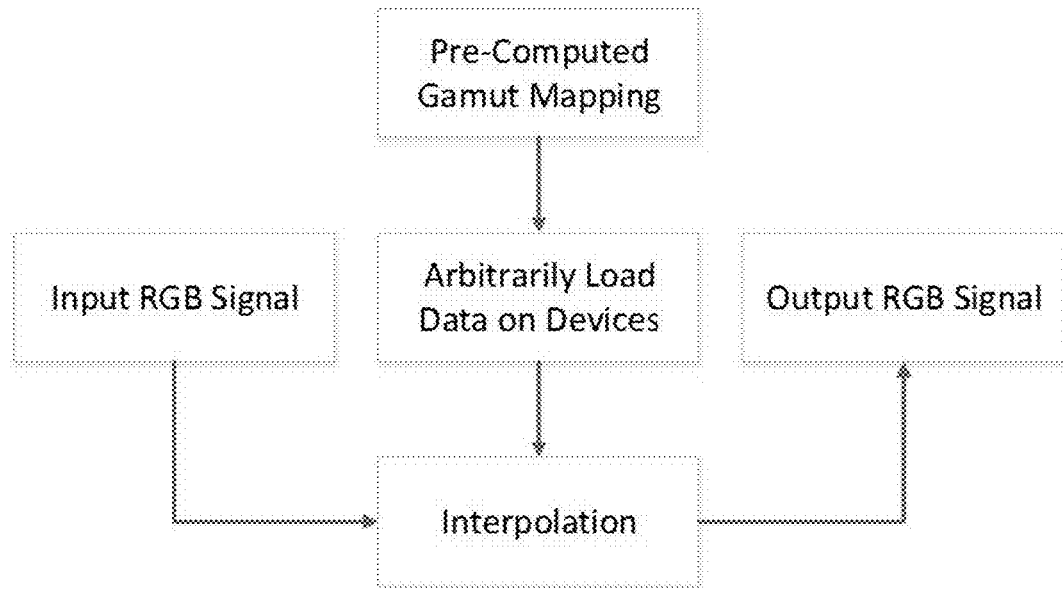
FIG. 2 illustrates an existing pre-computed gamut mapping framework.
Figure 3:
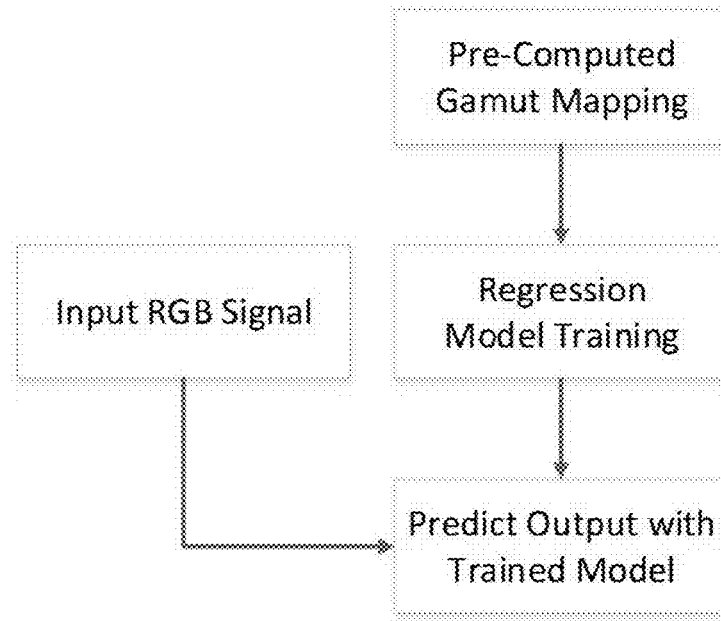
FIG. 3 illustrates another existing pre-computed gamut mapping framework.

FIG. 2 illustrates a framework of an existing pre-computed gamut mapping. FIG. 3 illustrates a framework of another existing pre-computed gamut mapping. Both frameworks in FIG. 2 and FIG. 3 are trying to approximate the pre-computed gamut mapping, however, neither provides a quantitatively modeling of the relationship between storage limitation and approximation lost.

Further, the framework shown in FIG. 2 does not include any analysis and computation before interpolation, thus after generating the entire gamut mapping, a subset of the mapping is loaded based on arbitrarily selection of interpolation method assuming the colors are uniformly distributed at the same time. However, the assumption may be incorrect, and the framework may not unable to provide a robust performance because the interpolation is arbitrarily chosen.

The framework shown in FIG. 3 adopts a regression model for training based on the pre-computed gamut mapping. However, the framework is subjected to the color representation in a three-dimensional (3D) space, and such a complicated regression problem may not be perfectly solved because of the three-dimensional space.

Overall speaking, empirical choices of interpolation algorithms, such as tetrahedral interpolation and cubic interpolation, often assume that RGB discretization is uniformly distributed in the color space. However, such an assumption may be incorrect in the real case. In addition, the existing color mapping methods may be unable to provide a scalable solution in accordance with different requirement of the hardware configuration.

Regression models may be unable to justify its linearity and choice of features, because using the 3D space such as RGB or XYZ only may not fit the model to achieve a desired performance. Moreover, the existing color mapping methods may only qualitatively evaluate the approximation performance, but fail to establish quantitative models for storage limitation and approximation loss. Thus, the current solutions may be unable to provide an optimal solution and scalability.

The present disclosure provides a scalable storage-loss optimized (SSLO) system for color gamut mapping. The SSLO system may establish a relationship between the storage limitation and the approximation loss in a scalable manner, thus an optimized solution for any given color gamut mapping situation and any device constrains may be achieved.

A pre-computed color gamut mapping may be used as prior knowledge in the SSLO system. By integrating a mapping modeling and color reproduction (MMCR) process, the SSLO system may establish a quantitative relationship between the storage limitation and the approximation loss of the entire color gamut mapping, and provide an optimized solution based on the established quantitative relationship. The SSLO system may have several advantages, such as scalability and real-time computing. The SSLO system may bridge the color gamut mismatch between the input device and the output device, for example, standard input video signals and nonstandard output display devices.

Figure 4:
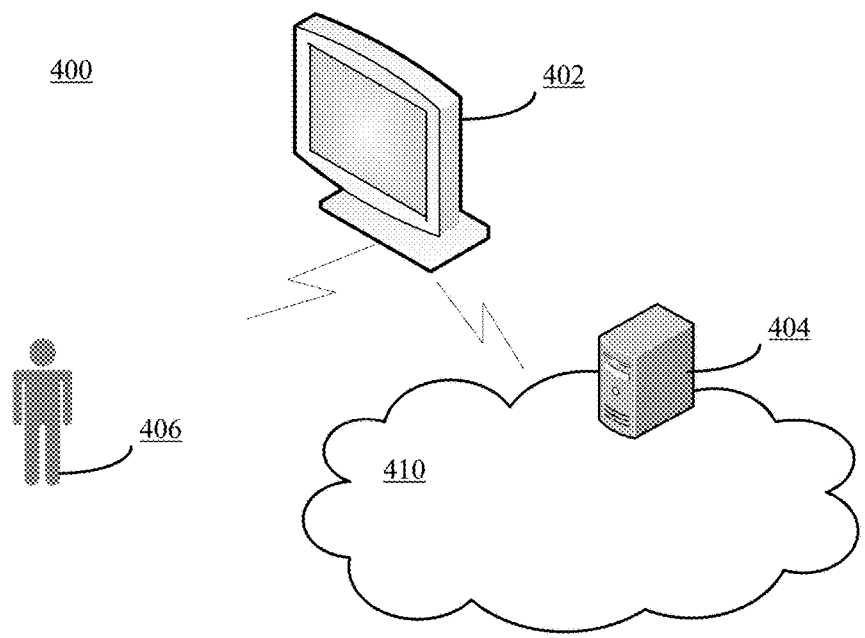
FIG. 4 illustrates an exemplary environment incorporating certain embodiments of the present invention.

FIG. 4 illustrates an exemplary environment 400 incorporating certain embodiments of the present invention. As shown in FIG. 4, environment 400 includes a user terminal 402, a server 404, a user 406, and a network 410. Other devices may also be included.

The user terminal 402 may include any appropriate type of electronic device with computing capabilities, such as a television (TV), a set top box, a mobile phone, a smart phone, a tablet, a personal computer (PC), a server computer, a laptop computer, and a digital personal assistant (PDA), etc. Further, the user terminal 402 may be any appropriate content-presentation device capable of presenting texts, images, videos, etc.

The server 404 may include any appropriate type of server computer or a plurality of server computers for providing personalized contents to the user 406. The server 404 may also facilitate the communication, data storage, and data processing between the other servers and the user terminal 402. The user terminal 402, and server 404 may communicate with each other through one or more communication networks 410, such as cable network, phone network, and/or satellite network, etc.

The user 406 may interact with the user terminal 402 to query and to retrieve various contents and perform other activities of interest, or the user may use voice, hand or body gestures to control the user terminal 402 if speech recognition engines, motion sensor or depth-camera is used by the user terminal 402. The user 406 may be a single user or a plurality of users, such as family members.

Figure 5:
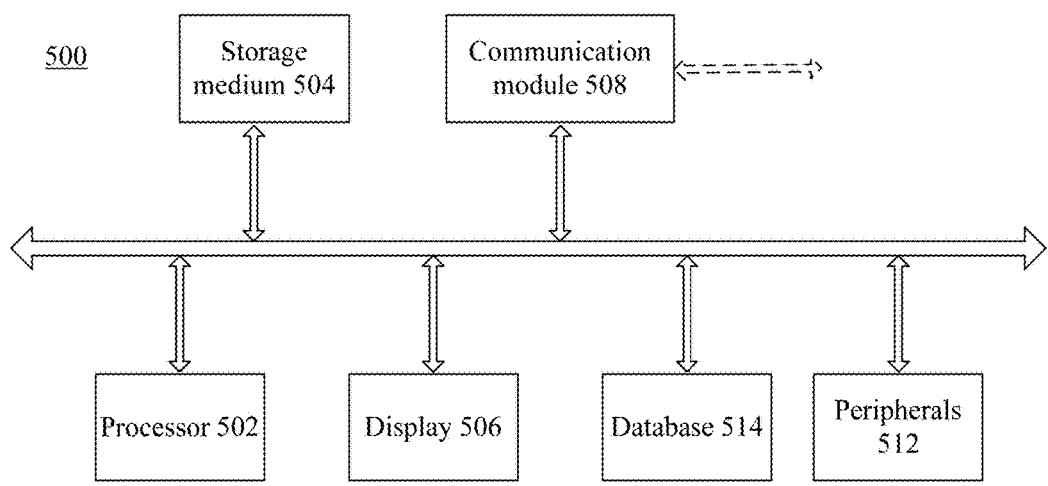
FIG. 5 illustrates an exemplary computing system consistent with disclosed embodiments.

The user terminal 402, and/or server 404 may be implemented on any appropriate computing circuitry platform. FIG. 5 shows a block diagram of an exemplary computing system capable of implementing the user terminal 402, and/or server 404

As shown in FIG. 5, the computing system 500 may include a processor 502, a storage medium 504, a display 506, a communication module 508, a database 314, and peripherals 312. Certain components may be omitted and other components may be included.

The processor 502 may include any appropriate processor or processors. Further, the processor 502 can include multiple cores for multi-thread or parallel processing. The storage medium 504 may include memory modules, such as ROM, RAM, flash memory modules, and mass storages, such as CD-ROM and hard disk, etc. The storage medium 504 may store computer programs for implementing various processes, when the computer programs are executed by the processor 502.

Further, the peripherals 512 may include various sensors and other I/O devices, such as keyboard and mouse, and the communication module 508 may include certain network interface devices for establishing connections through communication networks. The database 514 may include one or more databases for storing certain data and for performing certain operations on the stored data, such as database searching.

Figure 6:
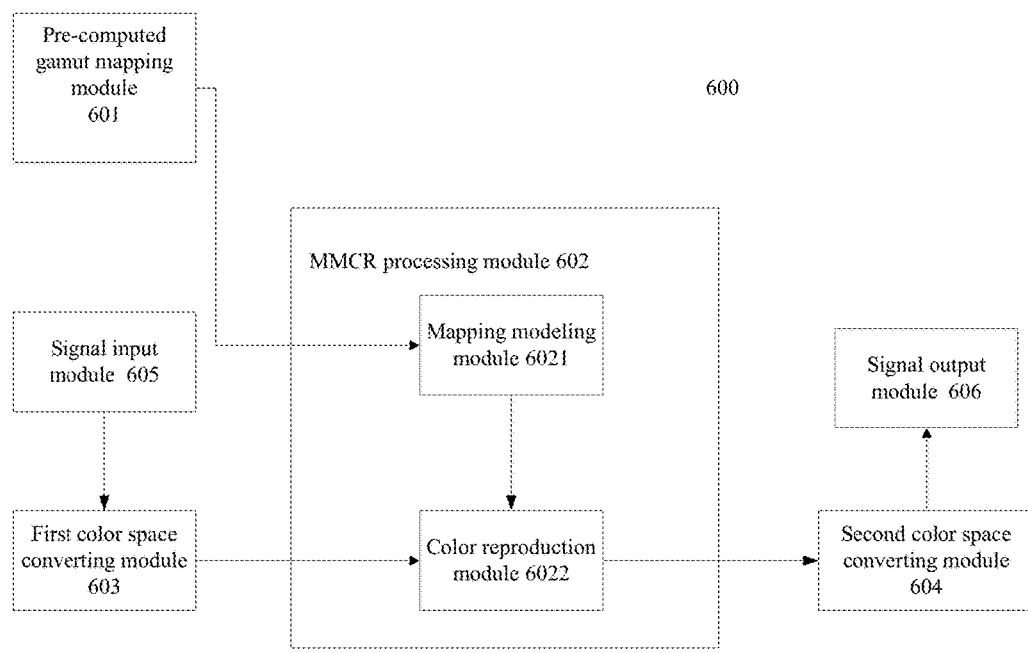
FIG. 6 illustrates a block diagram of an exemplary scalable storage-loss optimized system (SSLO) for color gamut mapping consistent with disclosed embodiments.

The user terminal 402 and/or server 404 may implement a SSLO system to realize a scalable storage-loss optimized color gamut mapping for the user 406. FIG. 6 illustrates an exemplary scalable storage-loss optimized (SSLO) system for color gamut mapping consistent with disclosed embodiments.

As shown in FIG. 6, the scalable storage-loss optimized system 600 may include a pre-computed gamut mapping module 601, a mapping modeling and color reproduction (MMCR) processing module 602, a first color space converting module 603, a second color space converting module 604, a signal input module 605, and a signal output module 606. The mapping modeling and color reproduction (MMCR) processing module 602 may further include a mapping modeling processing module 6021 and a color reproduction processing module 6022.

It should be noted that, in the disclosed embodiments, discrete RGB values may be adopted to represent a continuous color space in an input domain or input media and an output domain or output media, while XYZ values or XYZ coordinates may be adopted to represent a continuous color space in the MMCR processing. That is, a RBG color space may be adopted in the input domain and output domain, while a XYZ color space may be adopted in the MMCR processing module 602, which is only for illustrative purposes and is not intended to limit the scope of the present disclosure. In another embodiment, various color spaces may be adopted in the input domain, the output domain, and the MMCR processing module 602, such as Lab color space, LCH color space.

The signal input module 605 may be configured to receive an input RGB signal (e.g., RGB video signals, RGB image signals) having RGB color values to be processed from an input signal domain (not drawn in FIG. 6), and transfer the RGB color values to the first color space converting module 603. The first color space converting module 603 may be configured to convert RGB values to be processed to XYZ values to be processed, i.e., convert the RGB color space to the XYZ color space, and then transfer the XYZ values to be processed to the color reproduction processing module 6022.

The pre-computed gamut mapping module 601 may be configured to perform a pre-computed gamut mapping, in particular, generating fine-grained color matching pairs between each RGB value in the input domain and the corresponding output RGB value in the output domain. That is, the pre-computed gamut mapping module 601 may generate a pre-computed gamut mapping, and then transfer the pre-computed gamut mapping to the mapping modeling processing module 6021.

The mapping modeling processing module 6021 may be configured to use predetermined clustering modeling algorithm to model the pre-computed gamut mapping and compress the information needed to be stored in the output device through a learning or training process, such that trained clustering model may be obtained. The mapping modeling processing module 6021 may be also configured to transfer the trained clustering model to the color reproduction processing module 6022.

The color reproduction processing module 6022 may be configured to reproduce the colors based on the trained clustering model and interpolation, and transfer the reproduced colors (i.e., processed XYZ values) to the second color space converting module 604. The second color space converting module 604 may be configured to convert the processed XYZ values to the processed RGB values, i.e., convert the XYZ color space to the RGB color space. The signal output module 606 may be configured to receive the processed RGB values from the second color space converting module 604, and output the corresponding RGB signal to an output signal domain (not drawn in FIG. 6).

Figure 7:
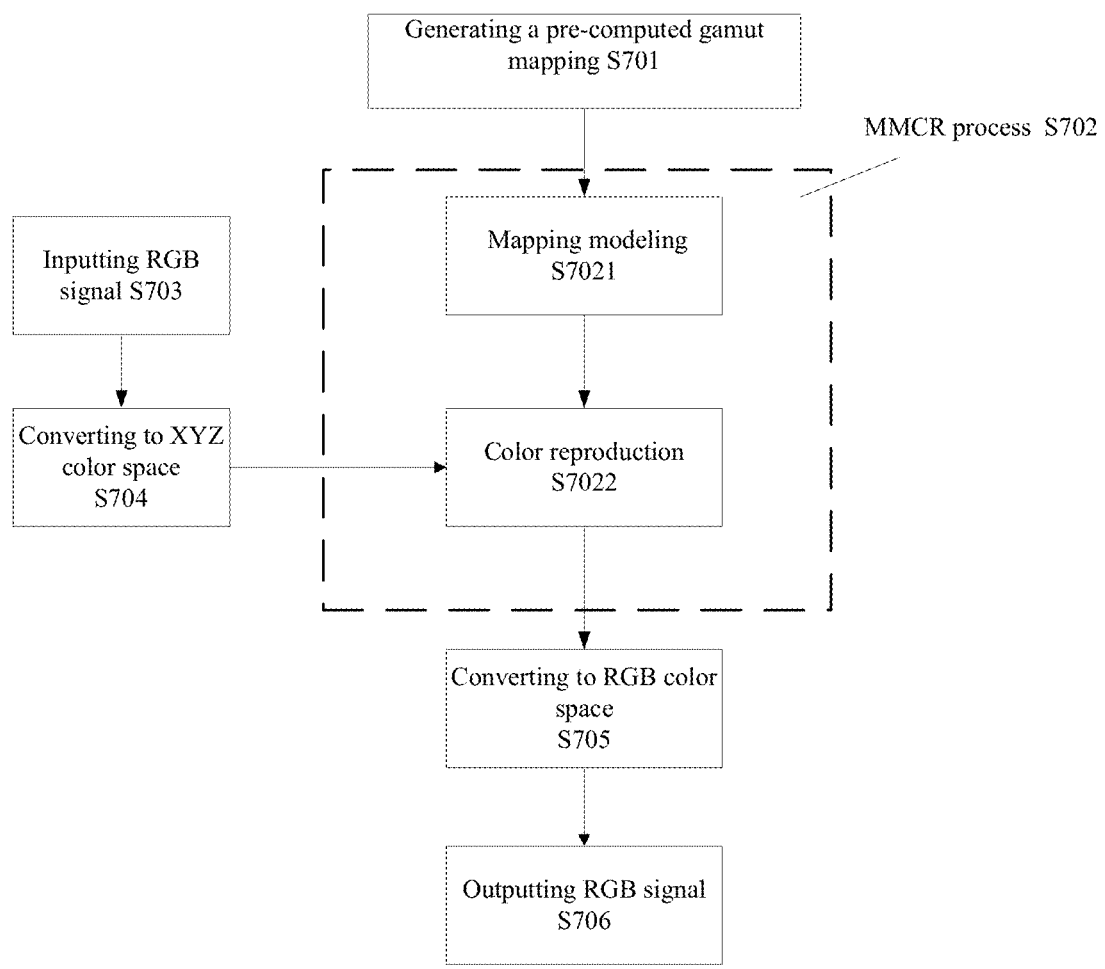
FIG. 7 illustrates an exemplary process performed by various modules in an exemplary SSLO system consistent with disclosed embodiments.

FIG. 7 illustrates an exemplary process 700 performed by various modules in an exemplary SSLO system consistent with disclosed embodiments. As shown in FIG. 7, at the beginning, the pre-computed gamut mapping module generates a color gamut mapping between an input signal domain and an output signal domain (S701), i.e., generating a matching RGB value (or XYZ value) in the output signal domain for each color in the input signal domain. The color gamut mapping between the input signal domain and the output signal domain is called as the pre-computed gamut mapping. The pre-computed gamut mapping may be adopted as prior knowledge to find a desired approximation of the entire gamut mapping under a given hardware limitation to achieve real-time computing.

Figure 8:
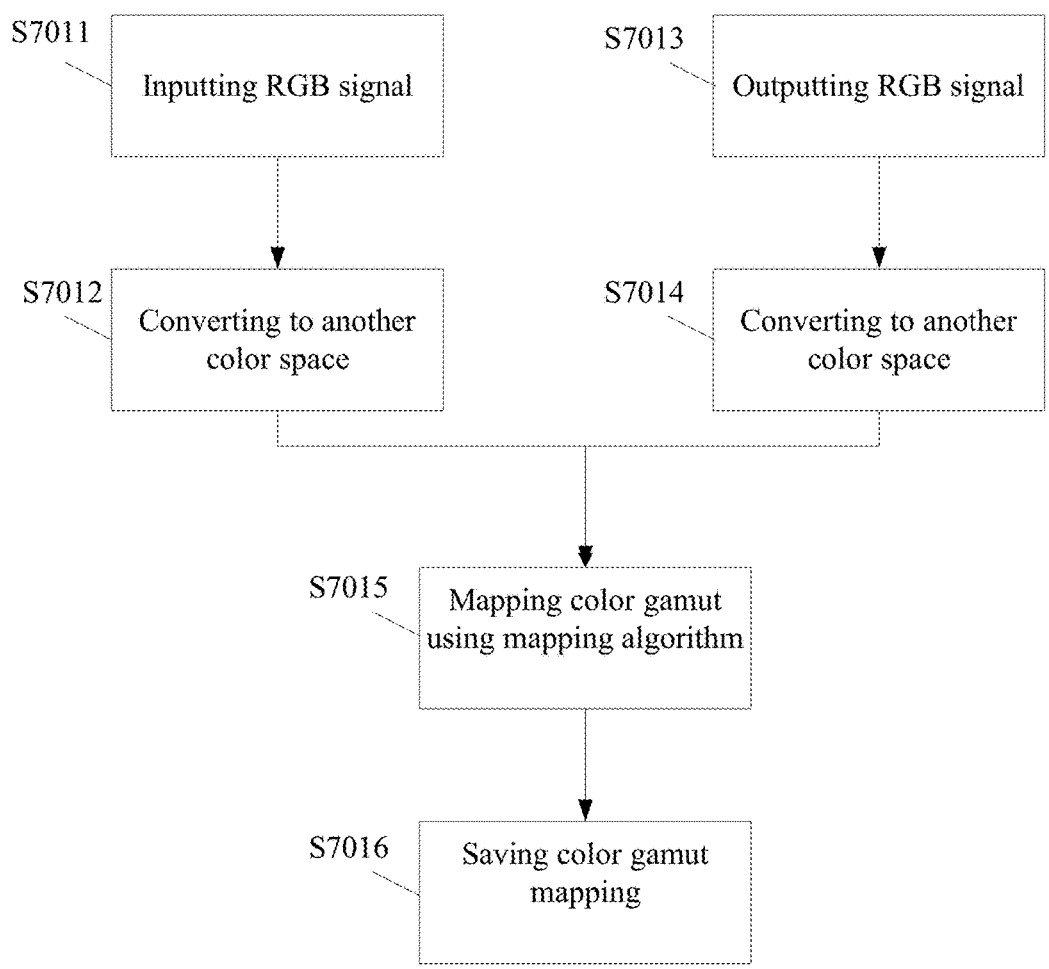
FIG. 8 illustrates a flow chart of an exemplary pre-computed gamut mapping process consistent with disclosed embodiments.

FIG. 8 illustrates a flow chart of an exemplary pre-computed gamut mapping consistent with disclosed embodiments. As shown in FIG. 8, at the beginning, at least one pre-saved (or reference) RGB signal from the input signal domain (i.e., pre-saved input domain RGB signal) is provided (S7011). The corresponding RBG color values of the pre-saved input domain RGB signal are converted to color values represented by another color space (e.g., XYZ color space) (S7012). Meanwhile, at least one pre-saved (or reference) RGB signal from the output signal domain (i.e., pre-saved output domain RGB signal) is provided (S7013). The corresponding RBG color values of the pre-saved output domain RGB signal are converted to color values represented by another color space (e.g., XYZ color space) (S7014).

The RBG color values of the pre-saved input domain RGB signal and the RBG color values of the pre-saved output domain RGB signal may be converted to color values represented by a same color space, respectively. Then a color gamut mapping between the input signal domain and the output signal domain (called as the pre-computed gamut mapping) is generated based on predetermined algorithms (S7015) and saved for following process (S7016).

In particular, when generating the pre-computed gamut mapping, computational and memory-wised upper bound is assumed to be unlimited, because a general PC often finishes the task within a reasonable time. The pre-computed gamut mapping may have an amount of 256×256×256 colors, because the RGB discretization can represent such a number of colors. The pre-computed gamut mapping may be performed in either RGB color space, or other color spaces such as XYZ, Lab, and LCH color space according to the various predetermined algorithms, input signal domains and output signal domains.

The principles of generating the pre-computed gamut mapping due to the mismatch between an input color gamut and an output color gamut may be categorized into two folds: (a) displaying the original input colors with least distortion; or (b) displaying the original input colors with fully explored output color gamut. These two folds may be two different tasks, because the display devices (i.e., output device) often provide a wider range of gamut having a partial mismatch with the input gamut.

That is, the output gamut may have a wider range than the input gamut, and a partial mismatch may exist between the output gamut and the input gamut. According to principle (a), only a certain subset of the output color gamut may be used. According to principle (b), the colors may change in terms of luminance, and chroma or hue depending on the color space and the predetermined algorithm may exhibit higher dynamic range.

The disclosed SSLO system may be implemented with any predetermined color gamut mapping algorithms following either principle (a) or principle (b) according to various requirements and hardware configuration. Given an input color i represented by RGB $(r_i, g_i, b_i)$, a gamut mapping function denoted by G is written as:

$$G(i)=i' \qquad (1)$$

where i' indicates the corresponding output color in RGB scpace $(r_{i'}, g_{i'}, b_{i'})$ of the input pixel i. More specifically, the gamut mapping function may include converting RGB color space into other color spaces including XYZ, Lab or LCH depending on the selected algorithm. Thus, the gamut mapping function G may become a combination of a color space converting function (denoted by $\Psi$) and a mapping function $\Omega$ in the color space s where both the input and output colors may be converted to. Thus, Equation (1) can be written as:

$$G(i)=\Omega_s(\Psi(i)=i' \qquad (2)$$

Converting the RGB color space to the XYZ color space is formulated in Equation (3), $$\begin{bmatrix} x \\ y \\ z \end{bmatrix} = 100 \times M \times \begin{bmatrix} i_r \\ i_g \\ i_b \end{bmatrix} \qquad (3)$$

where the coefficient matrix M may be device dependent and may be a fixed matrix under a given device. In one embodiment, the coefficient matrix M may be a 3×3 matrix.

Because XYZ, Lab and LCH color spaces are device independent, converting from one color space to another color space may be defined as the following. Equation (4) and Equation (5) are the converting function $\Psi_{XYZ2Lab}$ from XYZ color space to Lab color space, and Equation (6) is the converting function $\Psi_{Lab2LCH}$ from Lab color space to LCH color space.

$$L = 116 \times f\left(\frac{y}{y_n}\right) - 16 \qquad (4)$$

$$a = 500 \times \left[ f\left(\frac{x}{x_n}\right) - f\left(\frac{y}{y_n}\right) \right]$$

$$b = 200 \times \left[ f\left(\frac{y}{y_n}\right) - f\left(\frac{z}{z_n}\right) \right]$$

where $[x_n, y_n, z_n]=[95.047, 100.0, 108.88]$ as default and f is defined in Equation (5):

$$f(t) = \begin{cases} t^{1/3} & \text{if } t > \left(\frac{6}{29}\right)^3 \\ \frac{1}{3}\left(\frac{29}{6}\right)^2 t + \frac{4}{29} & \text{otherwise} \end{cases} \qquad (5)$$

And the process of converting Lab to LCH is defined in Equation (6):

$$h = \tan h^{-1}(b/a)$$

$$c = \sqrt{a^2 + b^2} \qquad (6)$$

The options for the mapping function Ω may include but not limited to two-dimensional LCH mapping based in fixed H domain, three-dimensional based LCH mapping, variable anchor points based gamut mapping and so on. The disclosed SSLO system may adopt any appropriate gamut mapping algorithm according to various requirements.

Returning to FIG. 7, a RGB signal from the input signal domain is received (S703) and the corresponding RGB color values are converted to the XYZ color values (S704). Based on the pre-computed gamut mapping, the MMCR processing module performs a MMCR process on the converted XYZ values (S702).

Figure 9:
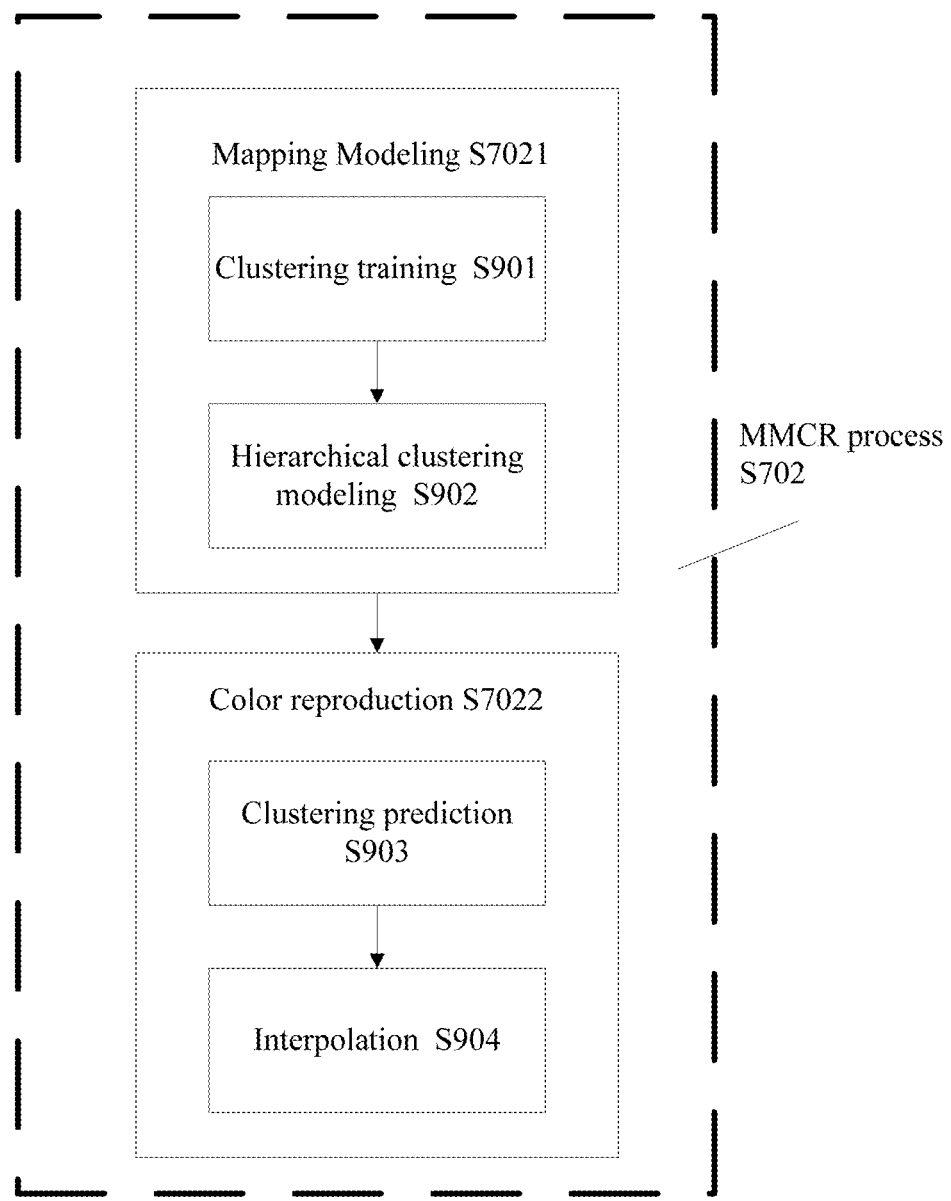
FIG. 9 illustrates a flow chart of an exemplary mapping modeling and color reproduction (MMCR) process consistent with disclosed embodiments.

FIG. 9 illustrates a flow chart of an exemplary MMCR process consistent with disclosed embodiments. Referring to FIG. 7 and FIG. 9, the MMCR process based on clustering may include a mapping modeling (MM) training phase (S7021) and a color reproduction (CR) predicting phase (S7022). The mapping modeling (MM) training phase (S7021) may further include clustering training (S901) and hierarchical clustering modeling (S902). The color reproduction (CR) predicting phase (S7022) may further include clustering predication (S903) and interpolation (S904).

Figure 10A:
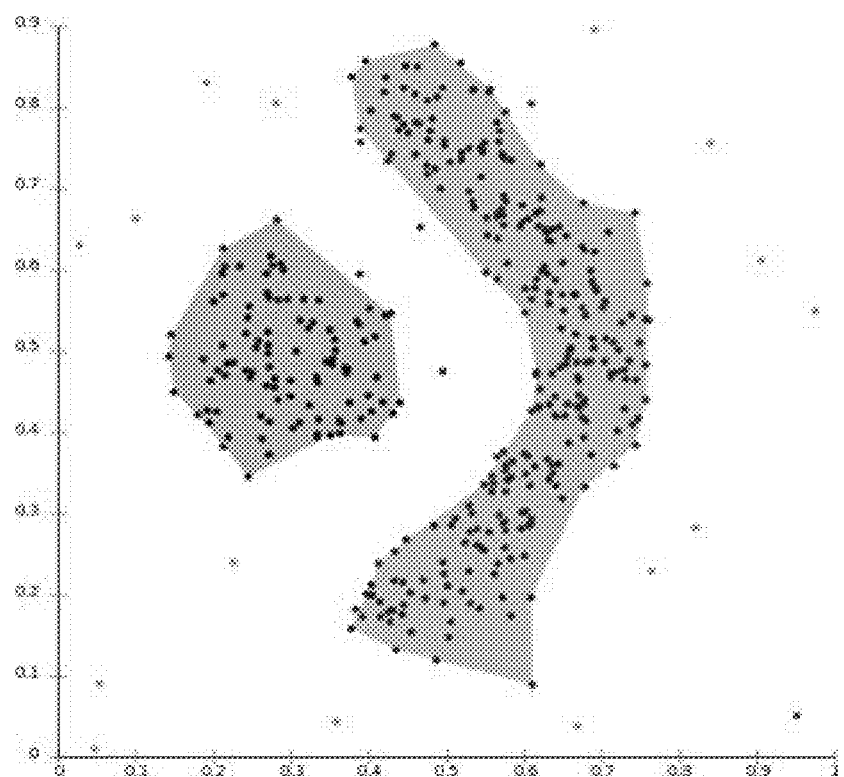
FIG. 10a illustrates a density-based spatial clustering of applications with noise (DBSCAN) algorithm.

Clustering, also known as unsupervised learning, is a technique of grouping a set of similar objects based on a metric defined by a given circumstance. A clustering algorithm may include two steps: training and testing. FIG. 10a illustrates a density-based spatial clustering of applications with noise (DBSCAN) algorithm. DBSCAN is a density-based clustering algorithm in which areas with similar object density may merge to one cluster.

Figure 10B:
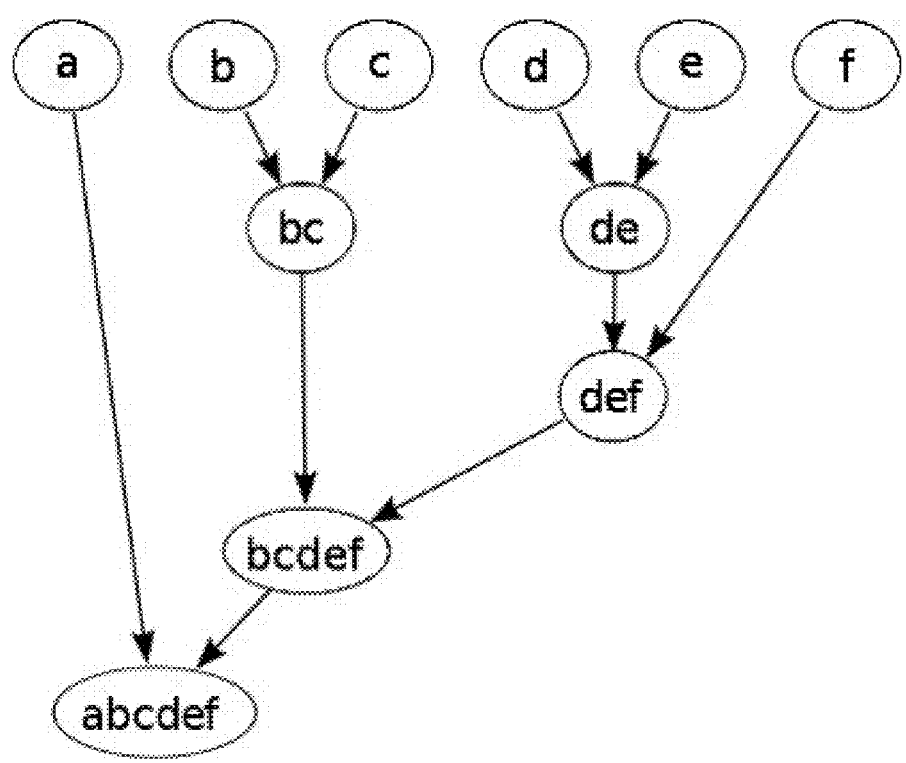
FIG. 10(b) illustrates an exemplary Hierarchical clustering consistent with disclosed embodiments.

In particular, Hierarchical clustering is a method of building a cluster hierarchy in the modeling. FIG. 10(b) illustrates an exemplary Hierarchical clustering consistent with disclosed embodiments. As shown in FIG. 10(b), a dendrogram may be used to denote the process of hierarchical clustering. Clusters may gradually join together in each step, and the final dendrogram may provide the scalability desired in the disclosed SSLO system. The number of clusters and the size of each cluster may be adaptively chosen to coordinate with the hardware requirements, such that an optimum solution for various hardware configurations may be achieved. In the disclosed embodiments, Hierarchical clustering algorithm may include but not limited to BIRCH, Chameleon, and probabilistic hierarchical clustering.

Returning to FIG. 9, at the beginning, various models to group colors into clusters are learned in the training step (S901), i.e., the clustering training. Then Hierarchical clustering is adopted to model the pre-computed gamut mapping and compress the data needed to be loaded on the devices in the output domain (S902). Instead of the entire mapping, only the information for each cluster may be required to model the pre-computed gamut mapping.

Given the pre-computed gamut mapping resulting from the step S701, the clustering model may be trained to achieve the least distortion in each step. Then a dendrogram of clusters may be generated, to which depth the colors may be clustered may be chosen, and the clustering models and three or four color points according to the hardware requirements may be saved empirically.

In particular, the mapping modeling (MM) training phase (S7021) may convey most of computation, in which the mapping modeling (MM) training phase (S7021) may be performed offline and may only have to be performed once.

Generally, there are two types of hierarchical clustering: (a) agglomerative nesting (AGNES), and (b) divisive analysis (DIANA). The AGNES approach is a bottom-up approach where each object is one cluster at the beginning and the most similar pair of clusters is merging in each step based on a certain criterial. As a comparison, the DIANA approach is a top-down approach where all objects start in one cluster and then gradually split in the following steps. Both AGNES and DIANA are following the same logic that given a defined distance metric, clusters are merging or splitting under a certain criterial.

For example, given two pixels i and j, a distance between the two pixels i and j may be defined using Euclidean distance using both RGB or XYZ color representation in Equation (7), or other metrics such as Manhattan distance, maximum distance and etc.

$$dist_{RGB}(i,j) = \sqrt{(r_i - r_j)^2 + (g_i - g_j)^2 + (b_i - b_j)^2} \quad (7)$$

$$dist_{XYZ}(i,j) = \sqrt{(x_i - x_j)^2 + (y_i - y_j)^2 + (z_i - z_j)^2}$$

In addition, other well-defined color difference metric may also serve as a distance metric, such as CIEDE2000. Given a pair of color pixel i and j, and their corresponding Lab value $(L_i, a_i, b_i)$ and $(L_j, a_j, b_j)$, the color difference $\Delta E_{00}$ is computed in the following process:

(a). Computing $C'_u$, $h'_u$, where u=i, j:

$$C_{u,ab} = \sqrt{(a_u)^2 + (b_u)^2}, u = i, j \quad (8)$$

$$\overline{C_{ab}} = \frac{C_{i,ab} + C_{j,ab}}{2}$$

$$G = 0.5 \times \left(1 - \sqrt{\frac{\overline{C_{ab}^7}}{\overline{C_{ab}^7} + 25^7}}\right)$$

$$a'_u = (1 + G)a_u$$

$$C'_u = \sqrt{(a'_u)^2 + (b_u)^2}$$

$$h'_u = \begin{cases} 0 & \text{if } b_u = a'_u = 0 \\ \tanh^{-1}(b_u, a'_u) & \text{otherwise} \end{cases} \quad (9)$$

(b). Computing ΔL', ΔC', ΔH':

$$\Delta L' = L_j - L_i \quad (10)$$

$$\Delta C' = C'_j - C'_i \quad (11)$$

$$\Delta h' = \begin{cases} 0, C'_j C'_i = 0 \\ h'_j - h'_i, C'_j C'_i \neq 0; |h'_j - h'_i| \leq 180° \\ (h'_j - h'_i) - 360, C'_j C'_i \neq 0; (h'_j - h'_i) > 180° \\ (h'_j - h'_i) + 360, C'_j C'_i \neq 0; (h'_j - h'_i) < -180° \end{cases}$$

$$\Delta H' = 2\sqrt{C'_i C'_j \sin\left(\frac{\Delta h'}{2}\right)} \quad (12)$$

(c). Computing $\Delta E_{00}$:

$$\overline{h}' = \begin{cases} \dfrac{h'_i + h'_j}{2}, & C'_j C'_j \neq 0; |h'_j h'_i| \leq 180° \\ \dfrac{h'_i + h'_j + 360°}{2}, & C'_j C'_j \neq 0; |h'_j - h'_j| > 180°; (h'_i + h'_j) < 360° \\ \dfrac{h'_i + h'_j - 360°}{2}, & C'_j C'_j \neq 0; |h'_j - h'_i| > 180°; (h'_i + h'_j) \geq 360° \\ h'_i + h'_j, & C'_j C'_j = 0 \end{cases} \quad (13)$$

$$T = 1 - 0.17\cos(\overline{h}' - 30°) + 0.24\cos(2\overline{h}') + 0.32\cos(3\overline{h}' + 6°) - 0.2\cos(4\overline{h}' - 63')$$

$$\Delta\theta = 30\exp\left\{-\left[\dfrac{\overline{h}' - 275°}{25}\right]^2\right\}$$

$$R_c = 2\sqrt{\dfrac{\overline{C}'^7}{\overline{C}'^7 + 25^7}}$$

$$S_L = 1 + \dfrac{0.015(\overline{L}' - 50)^2}{\sqrt{20 + (\overline{L}' - 50)^2}} \quad (14)$$

$$S_c = 1 + 0.45\overline{C}' \quad (15)$$

$$S_H = 1 + 0.015\overline{C}'T \quad (16)$$

$$R_T = -\sin(2\Delta\theta)R_c \quad (17)$$

$$\Delta E_{00}(i,j) = \sqrt{\left(\dfrac{\Delta L'}{k_L S_L}\right)^2 + \left(\dfrac{\Delta C'}{k_c S_c}\right)^2 + \left(\dfrac{\Delta H'}{k_H S_H}\right)^2 + R_T\left(\dfrac{\Delta C'}{k_c S_c}\right)\left(\dfrac{\Delta H'}{k_H S_H}\right)} \quad (18)$$

Based on distance metric definition, the next step is selecting linkage criteria, which means the rule to determine which pair of clusters may merge or split during each step. In other words, the linkage criterion is a distance metric between two clusters of colors. Given two clusters A and B, and the chosen distance metric d, there are several linkage criteria such as complete linkage clustering in Equation (19), single linkage clustering in Equation (20), average linkage clustering in Equation (21) and other variations.

$$\max\{d(x,y): x \in A, y \in B\} \quad (19)$$

$$\min\{d(x,y): x \in A, y \in B\} \quad (20)$$

$$\dfrac{1}{|A||B|}\sum_{x \in A}\sum_{y \in B} d(x,y) \quad (21)$$

Other types of hierarchical clustering may also be embedded in the disclosed SSLO system, such as BIRCH, and Chameleon, etc.

In the disclosed embodiments, for each step, the cost function defined specifically for each algorithm may be minimized. Such cost functions, including the linkage criteria (i.e., the distances between clusters), may be served to formulate the approximation loss for each step. Further, the (data) storage required to store the clusters in each step may be calculated, thus a storage-loss formulation may be established in the process.

Given the nature of clustering model optimization, an optimized solution for any given color gamut mapping situation and any device constrains may be realized may be realized. The Hierarchical clustering may be applied in any color space in accordance with the pre-computed gamut mapping process as discussed above.

Returning to FIG. 7 and FIG. 9, the color reproduction (CR) predicting phase (S7022) follows the mapping modeling (MM) training phase (S7021), in which the saved model and cluster information (e.g., save four or three color points for each clustering empirically) may be used to predict which cluster a given input pixel belongs to and to calculate the output color value in any given color space The trained model may be adopted to predict the cluster for each input color (S903), i.e., predict to which cluster each input color may be grouped. In particular, given a trained clustering hierarchy, the computation of predicting the cluster each input pixel may be grouped to may be costless, and may be performed in real-time. Moreover, considering the whole input frame as one matrix and applying matrix operation based on the model may be more time efficient. The formulation of prediction is different according to various hierarchical clustering algorithm, and is not discussed here.

Then the output colors may be reproduced by interpolation based on the information stored for each cluster (S904), i.e., the saved color points for each cluster may be used for interpolation to calculate the output color value. In particular, for each cluster A, let a set $S_A$ denote the set of matching pairs of saved input color points and the corresponding output color points $\{(c_1, c_1'), (c_2, c_2'), \ldots, (c_n, c_n')\}$, of which size $|S_A|=n$. It should be noted that that color point $c_u$ may be denoted in any color space, such as RGB and XYZ color space. Given a new input color $c_i$ that is predicted to be in cluster A, and the chosen distance metric d, the corresponding output color $c_i'$ may be calculated by interpolation.

Various interpolation algorithms may be adopted in Step S904. In one embodiment, linear interpolation may be adopted in the following process. First distance vector $dist_A(c)$ is computed of which each entry is the distance between the input color and each color point in set $S_A$:

$$dist_A(c_i) = [d(c_i, c_1), d(c_i, c_2), \ldots, d(c_i, c_n)] \quad (22)$$

Then the weight vector w is defined in Equation (23):

$$w = \dfrac{1./dist_A(c_i)}{\text{sum}(1./dist_A(c_i))} \quad (23)$$

and the output color $c_i'$ is the weighted average of the corresponding output color points stored in set $S_A$, as expressed in Equation (24):

$$c_i' = w \times [c_1', c_2', \ldots, c_n'] \quad (24)$$

Returning to FIG. 7, after the output colors are reproduced, the XYZ color space is converted to the RBG color space (S705), and the corresponding RGB signal is outputted, for example, to the devices in the output domain (S706).

Color gamut mismatch between input and output signals is a common issue that has not been well-solved, because of the hardware bottleneck in terms of memory space and computational cost, and lack of standards in modern terminal devices such as printers and monitors. The disclosed scalable storage-loss optimized color gamut mapping framework (SSLO) with a process consists of color gamut mapping modeling and color reproduction (MMCR) may solve the issue, through quantitatively modeling the storage and the loss caused by approximating the entire pre-computed gamut mapping. Thus, the space cost for information to be loaded on the display devices may be reduce, while an optimized solution for any given hardware constrains may be realized.

The number of clusters in MMCR process may be adjusted to accommodate the hardware configurations on any display devices and an optimized solution for any given color gamut mapping situation and any device constrains may be realized. The disclosed MMCR process may be a do-once and use-multiple-times solution to the bottleneck raised by hardware. The offline compression step may take the majority computation, but may only require a one-time running. The color reproduction may be designed to be low-cost and featuring real-time computing.

The disclosed color gamut mapping framework may be scalable and adaptive to be implemented and tuned in accordance with the specific hardware requirements. The disclosed color gamut mapping framework may also be flexible to embed any color gamut mapping algorithm to generate pre-computed gamut mapping and any hierarchical clustering algorithm to generate dendrogram, for achieving the optical solution.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein

What is claimed is:

1. A method for a scalable storage-loss optimized (SSLO) system for color gamut mapping, comprising:
    generating a pre-computed color gamut mapping between an input color gamut and an output color gamut, wherein an input device in an input signal domain has the input color gamut, and an output device in an output signal domain has the output color gamut;
    receiving an input signal including a plurality of input pixels from the input device in the input signal domain, wherein the input pixels correspond to a set of first color values represented in a first color space;
    converting the set of the first color values to be a set of second color values represented in a second color space;
    based on the pre-computed color gamut mapping and the set of second color values, generating a set of third color values represented in the second color space through a mapping modeling and a color reproduction, wherein the mapping modeling comprising:
        based on the pre-computed color gamut mapping, generating at least one trained model through learning a plurality of models to group colors into clusters;
        performing a hierarchical clustering algorithm to model the pre-computed color gamut mapping; and
        saving a plurality of color points for each cluster;
    converting the set of the third color values to be a set of fourth color values represented in the first color space; and
    outputting an output signal including a plurality of output pixels corresponding to the fourth color values to the output device in the output signal domain.

2. The SSLO system method according to claim 1, wherein generating a pre-computed color gamut mapping between an input color gamut and an output color gamut further includes:
    receiving at least one input signal domain reference signal from the input device in the input signal domain and having a set of first reference color values represented in the first color space;
    converting the first reference set of color values represented in the first color space to be a set of second reference color values represented in the second color space;
    receiving at least one output signal domain reference signal from the output device in the output signal domain and having a set of third reference color values represented in the first color space;
    converting the set of third reference color values represented in the first color space to be a set of fourth reference color values represented in the second color space; and
    based on the second reference color values and the fourth reference color values, generating the pre-computed color gamut mapping between the input device in the input signal domain and the output device in the output signal domain.

3. The SSLO system method according to claim 2, wherein:
    the pre-computed color gamut mapping is generated based on a color gamut mapping function $G(i)=\Omega_s(\Psi(i))=i'$,
    wherein i denotes the input pixels corresponding to the first reference color values, i' denotes the output pixels corresponding to the third reference color values, $\psi$ denotes a color space converting function, and $\Omega$ denotes a color gamut mapping function in the second color space.

4. The SSLO system method according to claim 1, wherein:
    three or four color points are saved for each cluster.

5. The SSLO system method according to claim 1, wherein performing a hierarchical clustering algorithm to model the pre-computed color gamut mapping further including:
    calculating a distance between two pixels i and j in the second color space, where i and j is a positive integer respectively; and
    based on a linkage criterion, determining a merging or splitting of the clusters.

6. The SSLO system method according to claim 1, wherein the color reproduction further includes:
    based on the trained model, predicting the cluster each input pixel belongs to; and
    calculating the third color values through an interpolation based on the color points saved for each cluster.

7. The SSLO system method according to claim 6, wherein calculating the third color values through an interpolation based on the color points saved for each cluster further including:
    performing a linear interpolation to calculate the third color values.

8. The SSLO system method according to claim 7, wherein:
    based on the second color value $c_i$ predicted to be belong to a cluster A, the third color value $c'_i$ is determined based on $c'_i = w \times [c'_1, c'_2, \ldots, c'_n]'$,
    wherein w is a weight vector and $$w \frac{1./dist_A(c_i)}{sum(1./dist_A(c_i))},$$

$dist_A(c_i)$ is a first distance vector between each color point represented by the first color values in the cluster A and a color point represented by the third color value $c'_i$, and $dist_A(c_i)=[d(c_i, c_1), d(c_i, c_2), \ldots, d(c_i, c_n)]$, $c_n$ denotes the first reference color value included in the cluster A; and $c_n'$ denotes the corresponding fourth reference color value included in the cluster A.

9. A non-transitory computer-readable medium having computer program for, when being executed by a processor, performing a scalable storage-loss optimized (SSLO) system method, the method comprising:

generating a pre-computed color gamut mapping between an input color gamut and an output color gamut, wherein an input device in an input signal domain has the input color gamut, and an output device in an output signal domain has the output color gamut;

receiving an input signal including a plurality of input pixels from the input device in the input signal domain, wherein the input pixels correspond to a set of first color values represented in a first color space;

converting the first of the first color values to be a set of second color values represented in a second color space;

based on the pre-computed color gamut mapping and the set of second color values, generating a set of third color values represented in the second color space through a mapping modeling and a color reproduction, wherein the mapping modeling comprising:

based on the pre-computed color gamut mapping, generating at least one trained model through learning a plurality of models to group colors into clusters;

performing a hierarchical clustering algorithm to model the pre-computed color gamut mapping; and saving a plurality of color points for each cluster;

converting the set of the third color values to be a set of fourth color values represented in the first color space; and outputting an output signal including a plurality of output pixels corresponding to the fourth color values to the output device in the output signal domain.

10. The non-transitory computer-readable medium according to claim 9, wherein generating a pre-computed color gamut mapping between an input color gamut and an output color gamut further includes:

receiving at least one input signal domain reference signal from the input device in the input signal domain and having a set of first reference color values represented in the first color space;

converting the first reference set of color values represented in the first color space to be a set of second reference color values represented in the second color space;

receiving at least one output signal domain reference signal from the output device in the output signal domain and having a set of third reference color values represented in the first color space;

converting the set of third reference color values represented in the first color space to be a set of fourth reference color values represented in the second color space; and based on the second reference color values and the fourth reference color values, generating the pre-computed color gamut mapping between the input device in the input signal domain and the output device in the output signal domain.

11. The non-transitory computer-readable medium according to claim 10, wherein:

the pre-computed color gamut mapping is generated based on a color gamut mapping function $G(i)=\Omega_s(\Psi(i))=i'$, wherein i denotes the input pixels corresponding to the first reference color values, i' denotes the output pixels corresponding to the third reference color values, $\psi$ denotes a color space converting function, and $\Omega$ denotes a color gamut mapping function in the second color space.

12. The non-transitory computer-readable medium according to claim 9, wherein:

three or four color points are saved for each cluster.

13. The non-transitory computer-readable medium according to claim 9, wherein performing a hierarchical clustering algorithm to model the pre-computed color gamut mapping further including:

calculating a distance between two pixels i and j in the second color space, where i and j is a positive integer respectively; and based on a linkage criterion, determining a merging or splitting of the clusters.

14. The non-transitory computer-readable medium according to claim 9, wherein the color reproduction further includes:

based on the trained model, predicting the cluster each input pixel belongs to; and calculating the third color values through an interpolation based on the color points saved for each cluster.

15. The non-transitory computer-readable medium according to claim 14, wherein calculating the third color values through an interpolation based on the color points saved for each cluster further including:

performing a linear interpolation to calculate the third color values.

16. The non-transitory computer-readable medium according to claim 15, wherein:

based on the second color value $c_i$ predicted to be belong to a cluster A, the third color value $c'_i$ is determined based on $c'_i=w\times[c'_1, c'_2, \ldots, c'_n]'$, wherein w is a weight vector and $$w \frac{1./dist_A(c_i)}{sum(1./dist_A(c_i))},$$

$dist_A(c_i)$ is a first distance vector between each color point represented by the first color values in the cluster A and a color point represented by the third color value $c'_i$, and $dist_A(c_i)=[d(c_i, c_1), d(c_i, c_2), \ldots, d(c_i, c_n)]$, $c_n$ denotes the first reference color value included in the cluster A, and $c_n'$ denotes the corresponding fourth reference color value included in the cluster A.

* * * * *